(12) United States Patent
Morrison et al.

(10) Patent No.: US 8,789,453 B1
(45) Date of Patent: Jul. 29, 2014

(54) DISPENSER POD

(71) Applicant: The United States of America as represented by the Secretary of the Navy, Washington, DC (US)

(72) Inventors: Matthew MacDonald Morrison, Leonardtown, MD (US); Robert Harry Schilder, Great Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 36 days.

(21) Appl. No.: 13/772,717

(22) Filed: Feb. 21, 2013

(51) Int. Cl.
*B64D 1/04* (2006.01)
*F41F 3/065* (2006.01)
*B64D 7/08* (2006.01)

(52) U.S. Cl.
CPC .................................... *B64D 7/08* (2013.01)
USPC .................... 89/1.53; 89/1.817; 244/137.4

(58) Field of Classification Search
USPC ............... 89/1.53, 1.54, 1.806, 1.816, 1.817, 89/1.819, 1.8; 244/137.4; 102/347, 351, 102/357, 382
See application file for complete search history.

(56) References Cited

U.S. PATENT DOCUMENTS

| | | | | |
|---|---|---|---|---|
| 2,458,476 A | * | 1/1949 | Lauritsen et al. | 89/1.806 |
| 2,971,731 A | * | 2/1961 | Graw | 244/137.4 |
| 3,106,132 A | * | 10/1963 | Biermann et al. | 89/1.815 |
| 3,216,322 A | * | 11/1965 | Wenger et al. | 89/1.59 |
| 3,295,410 A | * | 1/1967 | Edwards | 89/1.51 |
| 3,315,565 A | * | 4/1967 | Nash | 89/1.807 |
| 3,412,640 A | * | 11/1968 | Nash | 89/1.806 |
| 3,504,593 A | * | 4/1970 | Conn et al. | 89/1.807 |
| 3,719,120 A | * | 3/1973 | Elder et al. | 89/1.814 |
| 3,754,497 A | * | 8/1973 | Rusbach | 89/1.814 |
| 3,769,876 A | * | 11/1973 | Haas et al. | 89/1.8 |
| 3,893,366 A | * | 7/1975 | Murray | 89/1.801 |
| 3,988,961 A | * | 11/1976 | Banta et al. | 89/1.807 |
| 4,429,611 A | * | 2/1984 | Oldham et al. | 89/1.816 |
| 5,400,689 A | * | 3/1995 | Hutter et al. | 89/1.816 |
| 6,227,096 B1 | * | 5/2001 | Thomas | 89/1.54 |
| 6,655,254 B1 | * | 12/2003 | Nicodemus | 89/1.54 |

* cited by examiner

*Primary Examiner* — Michael Carone
*Assistant Examiner* — Jonathan C Weber
(74) *Attorney, Agent, or Firm* — Mark O. Glut; NAWCAD

(57) ABSTRACT

A dispenser pod, which includes a dispenser chassis with a first chassis end, a second chassis end and a chassis chamber, a first chassis end cover for covering the first chassis end, a second chassis end cover for covering the second chassis end, a launch system, and at least one sway brace. The first chassis end cover has at least one expendable passageway for accepting an expendable launch canister such that the expendable launch canister can enter the chassis chamber. The launch system is for expelling the expendable launch canister from the chassis chamber and through the expendable passageway. The at least one sway brace is for securing the expendable launch canister within the chassis chamber.

3 Claims, 5 Drawing Sheets

DISPENSER POD

STATEMENT OF GOVERNMENT INTEREST

The invention described herein may be manufactured and used by or for the Government of the United States of America for governmental purposes without payment of any royalties thereon or therefor.

BACKGROUND

United States Navy aircraft often utilize dispenser pods for launching expendables and for use on rocket launchers. These dispenser pods need to maintain the overall size, shape, and mass properties of the rocket launcher. The dispenser pods must also provide electromagnetic isolation, be able to be jettisoned, and withstand the ejection forces generated by a launch canister.

SUMMARY

The present invention is directed to a dispenser pod that meets the needs enumerated above and below.

The present invention is directed to a dispenser pod, which includes a dispenser chassis with a first chassis end, a second chassis end, and a chassis chamber, and a first chassis end cover for covering the first chassis end, a second chassis end cover for covering the second chassis end, a launch system, and at least one sway brace. The first chassis end cover has at least one expendable passageway for accepting an expendable launch canister such that the expendable launch canister is alignable within the chassis chamber. The launch system is for expelling the expendable launch canister from the chassis chamber and through the expendable passageway. The at least one sway brace is for securing the expendable launch canister within the chassis chamber.

It is a feature of the present invention to provide a dispenser pod that maintains overall size, shape, and mass properties of a particular rocket launcher.

It is a feature of the present invention to provide a dispenser pod that provides electromagnetic isolation of greater than 29 db between its interior and exterior.

It is a feature of the present invention to provide a dispenser pod that maintains launch canisters between −34 and 71 degrees Celsius.

It is a feature of the present invention to provide a dispenser pod that can withstand the ejection forces generated by a launch canister and is able to be jettisoned.

DRAWINGS

These and other features, aspects and advantages of the present invention will become better understood with reference to the following description and appended claims, and accompanying drawings wherein:

DESCRIPTION

Figure 1:
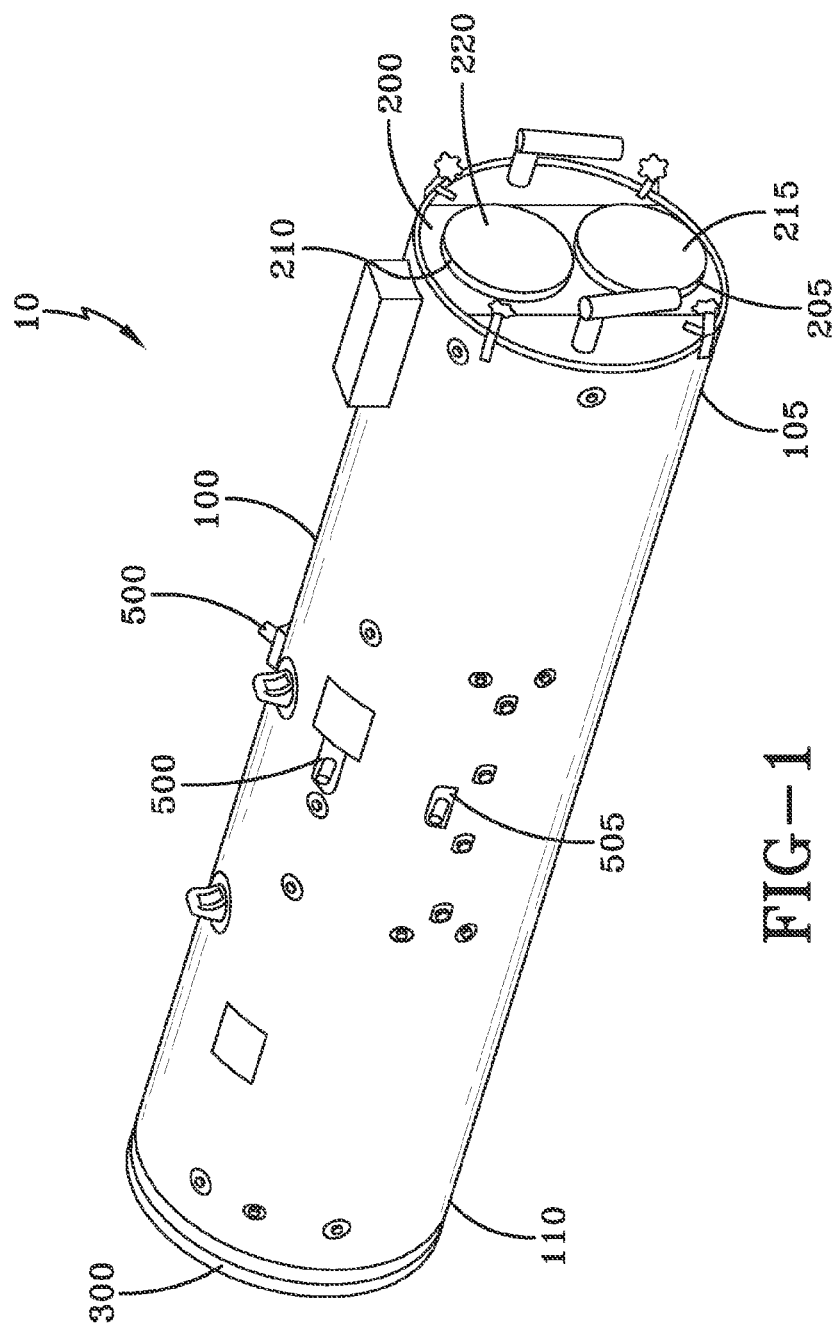
FIG. 1 is an external perspective view of an embodiment of the dispenser pod.
Figure 2:
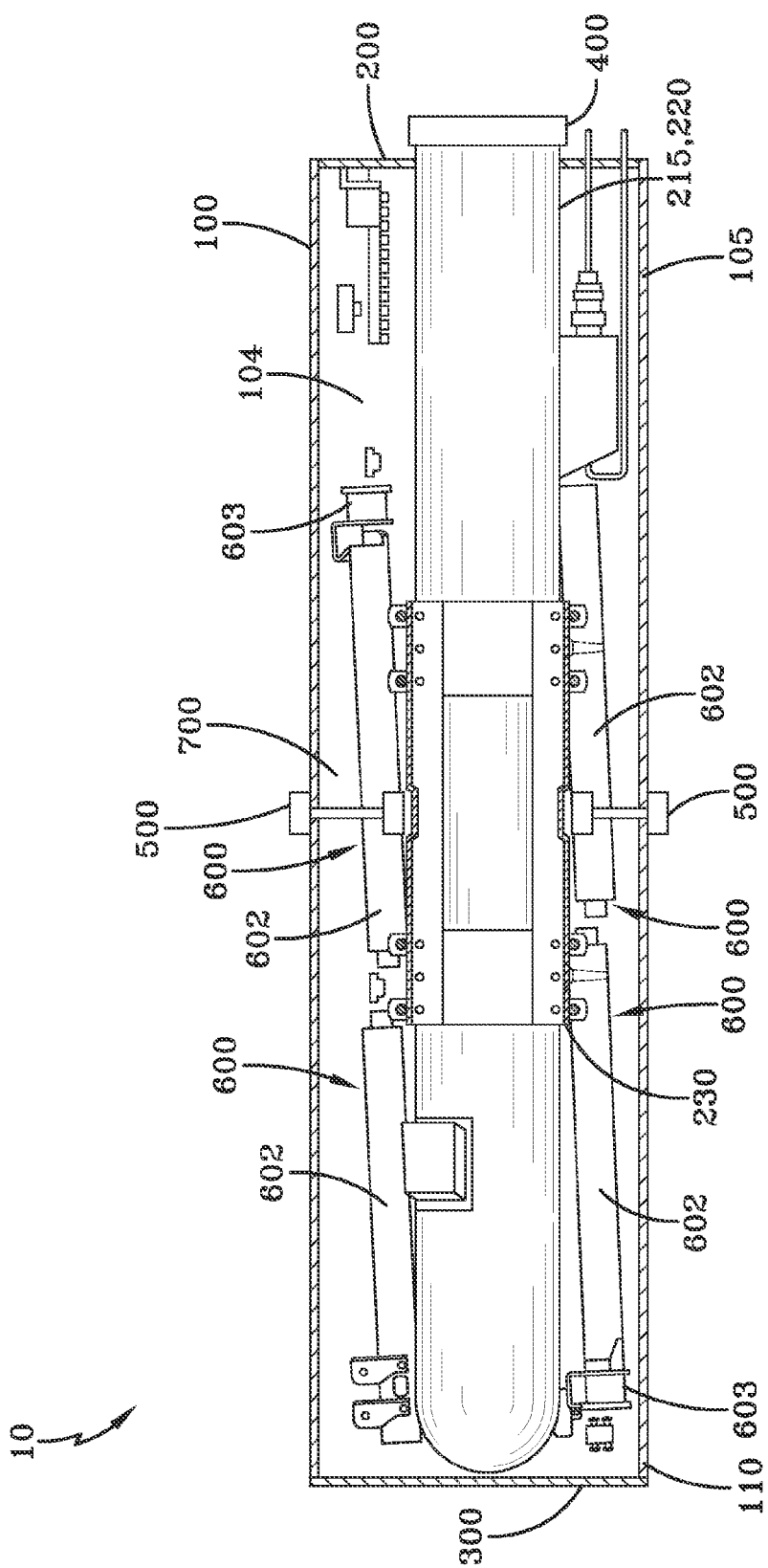
FIG. 2 is an internal top view of an embodiment of the dispenser pod.
Figure 3:
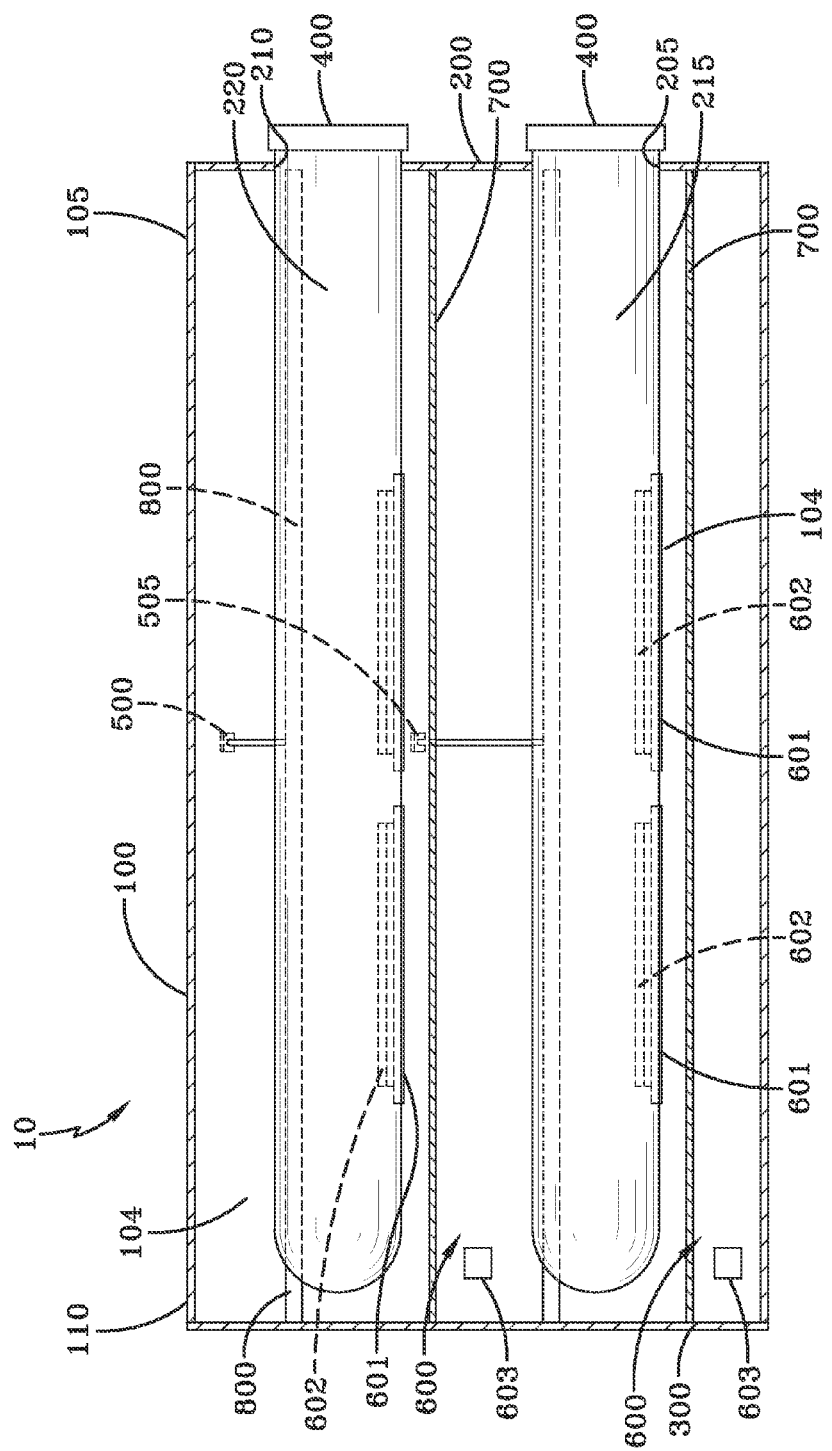
FIG. 3 is an internal side view of an embodiment of the dispenser pod.

The preferred embodiments of the present invention are illustrated by way of example below and in FIGS. 1-5. As shown in FIGS. 1-4, the dispenser pod 10 includes a dispenser chassis 100 with a chassis chamber 104, a first chassis end 105 and a second chassis end 110, a first chassis end cover 200 for covering the first chassis end 105, a second chassis end cover 300 for covering the second chassis end 110, a launch system 400, and at least one sway brace 500. The first chassis end cover 200 has at least one expendable passageway for accepting an expendable launch canister 215 such that the expendable launch canister 215 enters the chassis chamber 104. In the preferred embodiment, as shown in FIG. 3, there are two chassis chambers 104, one for a first expendable launch canister 215 and another for a second expendable launch canister 220. Correspondingly, there is a first expendable passageway 205 on the first chassis end cover 200 for accepting the first expendable launch canister 215 and a second expendable passageway 210 on the first chassis end cover 200 for accepting the second expendable launch canister 220. The launch system 400 is for expelling an expendable launch canister(s) 215, 220 from the chassis chamber(s) 104 and through the expendable passageway(s) 205, 210. The at least one sway brace 500 is for securing the expendable launch canister within the chassis chamber 104. In the preferred embodiment, there is are two first sway braces 505 and two second sway braces 500, such that the first sway braces 505 correspond to the first expendable launch canister 215, and the second sway braces 500 correspond to the second expendable launch canister 220.

In the description of the present invention, the invention will be discussed in a military environment; however, this invention can be utilized for any type of application that requires use of a dispenser pod.

In the preferred embodiment, the expendable launch canisters 215, 220 may be manufactured from fiberglass and can be expendable/disposable. Each expendable launch canister 215, 220 contains a launch system 400. In the preferred embodiment, the launch system 400 includes a cartridge actuated piston, an electrical harness, and a shear screw retainer system used to expel the expendable when actuated. However, any type of launch system that is practicable may be utilized.

Figure 4:
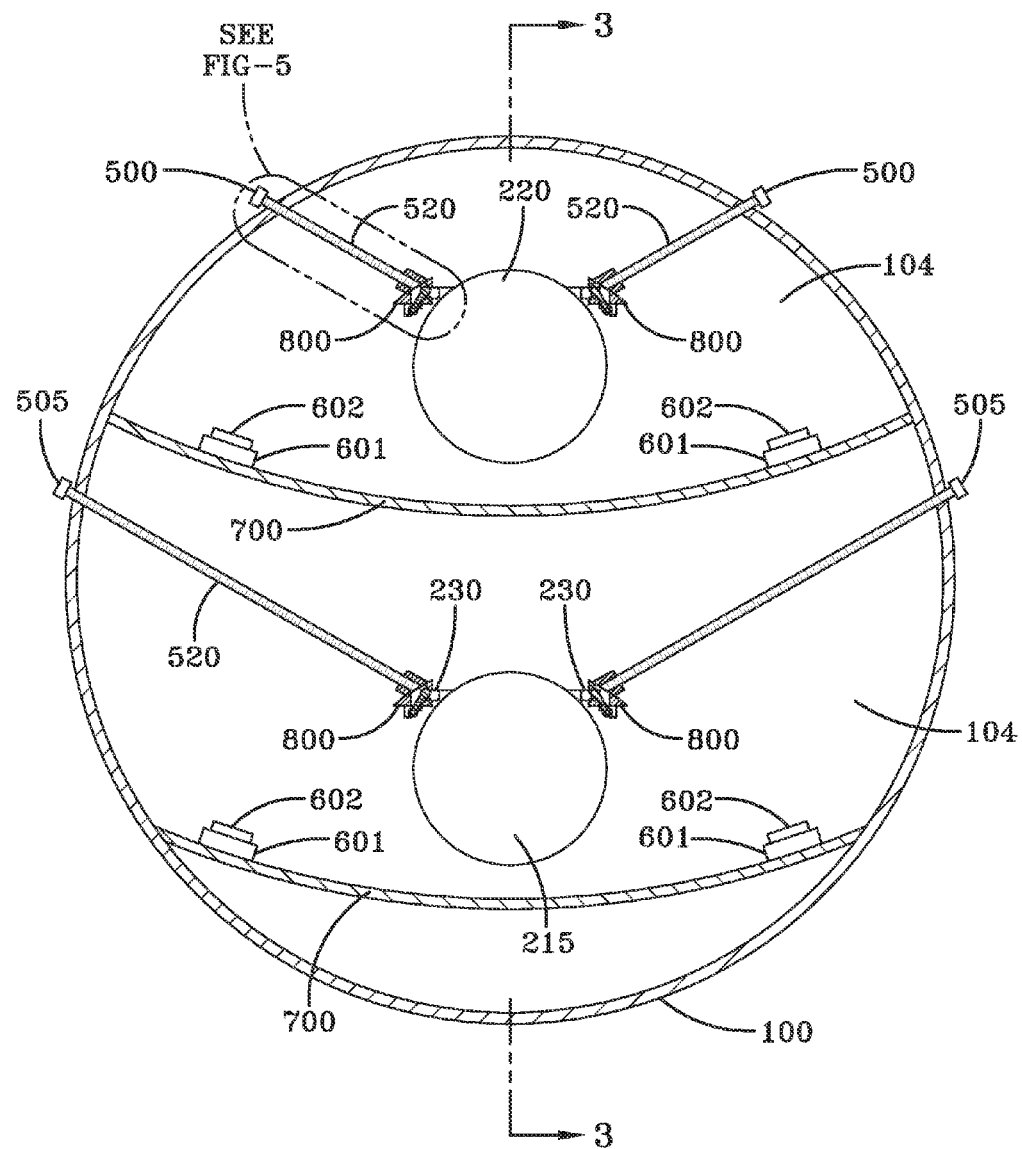
FIG. 4 is a cross sectional view of an embodiment of the dispenser pod.

The dispenser pod 10 may also include a dispenser pod heating system 600. The heating system 600 allows the dispenser pod 10 to maintain the expendable launch canisters 215, 220 between −34 degrees C. and 71 degrees C. As shown in FIGS. 2, 3, and 4, within each chassis chamber 104 there is a heating system 600 corresponding to each expendable launch canister 215, 220. In the preferred embodiment, each heating system 600 includes four heating elements 601 and a corresponding heat sink 602. The heating elements 601 and heat sinks 602 sets are disposed on opposite sides of the expendable launch canister, as shown in FIGS. 2 through 4, and are stacked on top of each other, with the heat sink 602 on top of the heating element 601. In the preferred embodiment, each heating element 601 is a wire resistor encased in a thin rectangular silicon rubber mat. Each mat is covered by an extruded aluminum finned heat sink 602. The heating elements 601 produce and conduct heat, while the heat sinks 602 transfer the heat to the surrounding air within the chassis chamber 104 such that a certain temperature is maintained in the chassis chamber 104.

The dispenser pod 10 may also include thermostatic control switches, thermostatic safety switches, and relays. These components may communicate with an exterior control panel that may be installed in an aircraft at a sensor station. The control panel may include a heater power switch, a panel dimmer, system circuit breakers, a reset switch, and/or a hot/cold indicator.

As shown in FIGS. 2, 3 and 4, the dispenser pod 10 may also include an electrical tray 700. The electrical tray 700 is able to electrically support bus interference wiring and the heating systems 600. In the preferred embodiment, each chassis chamber 104 includes a corresponding electrical tray 700. Each electrical tray 700 is designed to support store bus wiring and a heating system 600. Each electrical tray 700 may have a disconnect which allows it to be removed from the dispenser pod 10 for separate assembly and maintenance. Each electrical tray 700 may also include a fan 603 disposed near the heating elements 601 such that the fan 603 can circulate the air within the chassis chamber 104. In the preferred embodiment, each electrical tray 700 may include the heating elements 601 and the fan 603 integrated within. As seen in FIG. 4, the electrical tray 700 may be curved.

Figure 5:
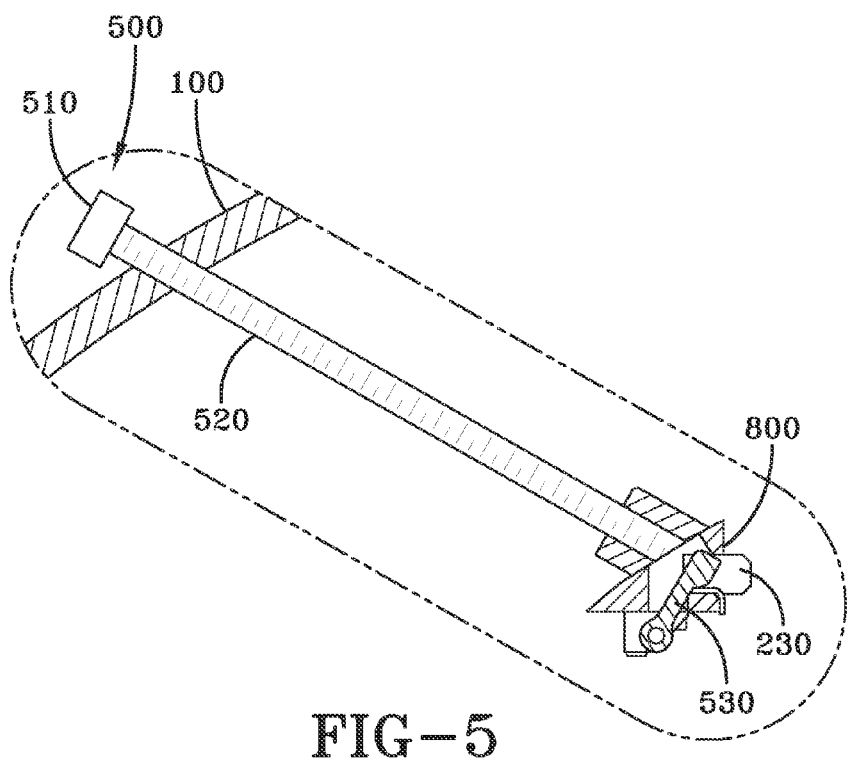
FIG. 5 is an exploded view of an embodiment of the rail/sway brace configuration.

In the preferred embodiment, a rail assembly 800 is disposed within each chassis chamber 104. The expendable launch canisters ride along the rail assembly 800 such that when actuated each expendable launch canister(s) passes through its corresponding expendable passageway and out the dispenser pod 10. As seen in FIGS. 4 and 5, each expendable launch canister 215, 220 may include a set of yokes 230. The yokes 230 correspond to the rail assembly 800. As seen in FIG. 5, each sway brace 500, 505 includes a head 510, a screw portion 520, and a pawl 530. The head 510 is disposed outside the dispenser chassis 100, while the screw portion 520 passes through the dispenser chamber 100, and the chassis chamber 104, then aligned with the rail assembly 800 such that end of the screw portion 520 corresponds to the pawl 530 which presses on the yoke 230, such that the expendable canisters can be more tightly or less tightly secured within the chamber chassis 104.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A dispenser pod, comprising of:
a dispenser chassis, the chassis having a first chassis end and a second chassis end, the dispenser having first chassis chamber for holding a first expendable launch canister and a second chassis chamber for holding a second expendable launch canister, the first chassis chamber includes a first heating system, the second chassis chamber includes a second heating system, the first heating system and second heating system each comprising at least one heating element and at least one heat sink, each heating element is a wire resistor encased in a thin rectangular silicon rubber mat;
a first chassis end cover for covering the first chassis end, the first chassis end cover having at a first expendable passageway for accepting the first expendable launch canister such that the first expendable launch canister can enter and exit the first chassis chamber, and a second expendable passageway for accepting the second expendable launch canister such that the second expendable launch canister can enter and exit the second chassis chamber;
a second chassis end cover for covering the second chassis end;
a first launch system for expelling the first expendable launch canister from the first chassis chamber and through the first expendable passageway;
a second launch system for expelling the second expendable launch canister from the second chassis chamber and through the second expendable passageway;
a first sway brace for securing the first expendable launch canister within the first chassis chamber; and
a second sway brace for securing the second expendable launch canister within the second chassis chamber.

2. The dispenser pod of claim 1, wherein the dispenser pod further comprising of at least one electrical tray, the tray being able to electrically support bus interference wiring and the heating system.

3. The dispenser pod of claim 2, wherein the first chassis chamber and the second chassis chamber have a rail assembly disposed within, the rail assembly disposed within each chassis chamber such that the expendable launch canister can travel within the chassis chamber and through the expendable passageway.

* * * * *